US007757890B2

(12) United States Patent
Alford et al.

(10) Patent No.: US 7,757,890 B2
(45) Date of Patent: Jul. 20, 2010

(54) CYLINDRICAL CONTAINER DISPENSER

(75) Inventors: Alton E. Alford, Buffalo Grove, IL (US); Randall G. Singer, Arlington Heights, IL (US); Lance Mastalka, St. Charles, IL (US); Guillermo Bangit, Skokie, IL (US); Jeff Fridrich, Chicago, IL (US); John Ward, Barrington, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 458 days.

(21) Appl. No.: 11/248,557

(22) Filed: Oct. 12, 2005

(65) Prior Publication Data

US 2007/0080166 A1 Apr. 12, 2007

(51) Int. Cl.
*B65G 59/00* (2006.01)

(52) U.S. Cl. .............................. 221/2; 221/3; 221/257; 221/256; 221/255; 221/281; 221/151; 221/251

(58) Field of Classification Search .......... 221/1–312 C
See application file for complete search history.

(56) References Cited

U.S. PATENT DOCUMENTS

| | | | | | |
|---|---|---|---|---|---|
| 1,678,355 | A | * | 7/1928 | Roberts | 221/204 |
| 1,861,834 | A | * | 6/1932 | Binggeli | 221/205 |
| 2,299,835 | A | * | 10/1942 | Mayer | 221/147 |
| 3,472,421 | A | * | 10/1969 | Baller | 221/196 |
| 4,146,122 | A | * | 3/1979 | Harris | 194/253 |
| 4,194,647 | A | * | 3/1980 | Spurrier | 221/97 |
| 4,205,763 | A | * | 6/1980 | Merl | 221/173 |
| 4,238,051 | A | * | 12/1980 | Sherman | 221/205 |
| 4,397,606 | A | | 8/1983 | Bruton | |
| 4,416,380 | A | | 11/1983 | Flum | |
| 4,454,949 | A | | 6/1984 | Flum | |
| D275,058 | S | | 8/1984 | Flum | |
| 4,470,943 | A | | 9/1984 | Preis | |
| 4,478,337 | A | | 10/1984 | Flum | |
| 4,590,696 | A | | 5/1986 | Squitieri | |
| 4,593,823 | A | | 6/1986 | Fershko et al. | |
| 4,744,489 | A | * | 5/1988 | Binder et al. | 221/6 |
| 4,771,898 | A | | 9/1988 | Howard et al. | |
| 4,801,025 | A | | 1/1989 | Flum et al. | |
| 4,809,855 | A | | 3/1989 | Bustos | |
| 4,923,070 | A | | 5/1990 | Jackle et al. | |

(Continued)

FOREIGN PATENT DOCUMENTS

| | | |
|---|---|---|
| WO | 2006094058 | 8/2006 |

*Primary Examiner*—Gene Crawford
*Assistant Examiner*—Michael K Collins
(74) *Attorney, Agent, or Firm*—Banner & Witcoff, Ltd.

(57) ABSTRACT

A system for dispensing cylindrical containers is disclosed. In an embodiment, a housing with an upper opening and a lower opening includes a track that connects the upper and lower openings. A drawer is mounted in the lower opening so that containers placed in the upper opening may travel along the track until they reach the drawer. In an embodiment opening the drawer allows a single container to be removed. A plurality of tracks connecting a plurality of upper and lower openings may be provided so that different types of containers may be dispensed. In an embodiment the drawer may be lockable and a cover that may include a lock may be mounted to the housing so as to cover the upper opening. In an embodiment, a sensor may be included to detect the opening of the drawer.

10 Claims, 12 Drawing Sheets

U.S. PATENT DOCUMENTS

| | | | | |
|---|---|---|---|---|
| 4,958,739 | A | 9/1990 | Spamer | |
| RE33,515 | E | 1/1991 | Fershko et al. | |
| 4,997,094 | A | 3/1991 | Spamer et al. | |
| 5,000,344 | A * | 3/1991 | Janssen | 221/92 |
| 5,024,336 | A | 6/1991 | Spamer | |
| 5,159,753 | A | 11/1992 | Torrence | |
| 5,197,610 | A | 3/1993 | Bustos | |
| 5,247,798 | A * | 9/1993 | Collard, Jr. | 62/3.62 |
| 5,295,596 | A | 3/1994 | Squitieri | |
| 5,397,016 | A | 3/1995 | Torrence et al. | |
| 5,439,122 | A | 8/1995 | Ramsay | |
| 5,462,198 | A * | 10/1995 | Schwimmer | 221/130 |
| 5,597,150 | A | 1/1997 | Stein et al. | |
| 5,641,082 | A | 6/1997 | Grainger | |
| 5,645,176 | A | 7/1997 | Jay | |
| 5,695,076 | A | 12/1997 | Jay | |
| 5,695,077 | A | 12/1997 | Jay | |
| 5,707,034 | A | 1/1998 | Cotterill | |
| 5,711,432 | A | 1/1998 | Stein et al. | |
| 5,720,230 | A | 2/1998 | Mansfield | |
| 5,738,019 | A | 4/1998 | Parker | |
| 5,749,478 | A | 5/1998 | Ellis | |
| D402,490 | S | 12/1998 | Parham | |
| 5,865,324 | A | 2/1999 | Jay et al. | |
| 5,904,256 | A | 5/1999 | Jay | |
| 5,944,201 | A | 8/1999 | Babboni et al. | |
| 5,970,887 | A | 10/1999 | Hardy | |
| 5,975,318 | A | 11/1999 | Jay | |
| 6,021,908 | A | 2/2000 | Mathews | |
| 6,026,984 | A | 2/2000 | Perrin | |
| 6,068,142 | A | 5/2000 | Primiano | |
| 6,082,556 | A | 7/2000 | Primiano et al. | |
| 6,164,462 | A | 12/2000 | Mumford | |
| 6,173,845 | B1 | 1/2001 | Higgins et al. | |
| 6,206,237 | B1 * | 3/2001 | Dillon et al. | 221/289 |
| 6,209,731 | B1 | 4/2001 | Spamer et al. | |
| 6,209,733 | B1 | 4/2001 | Higgins et al. | |
| 6,234,325 | B1 | 5/2001 | Higgins et al. | |
| 6,234,326 | B1 | 5/2001 | Higgins et al. | |
| 6,234,345 | B1 * | 5/2001 | Minh et al. | 221/124 |
| 6,325,221 | B2 | 12/2001 | Parham | |
| 6,330,758 | B1 | 12/2001 | Feibelman | |
| 6,375,015 | B1 | 4/2002 | Wingate | |
| 6,381,966 | B1 * | 5/2002 | Barrow | 62/3.61 |
| 6,398,044 | B1 | 6/2002 | Robertson | |
| 6,419,100 | B1 | 7/2002 | Menz et al. | |
| 6,435,359 | B1 | 8/2002 | Priminano | |
| 6,439,402 | B2 | 8/2002 | Robertson | |
| 6,471,053 | B1 | 10/2002 | Feibelman | |
| 6,505,747 | B1 | 1/2003 | Robertson | |
| 6,523,702 | B1 | 2/2003 | Primiano et al. | |
| 6,554,143 | B1 | 4/2003 | Robertson | |
| 6,604,638 | B1 | 8/2003 | Primiano et al. | |
| 6,615,995 | B2 | 9/2003 | Primiano et al. | |
| 6,637,604 | B1 | 10/2003 | Jay | |
| 6,659,293 | B1 | 12/2003 | Smith | |
| 6,679,033 | B2 | 1/2004 | Hart et al. | |
| 6,679,389 | B1 | 1/2004 | Robertson et al. | |
| 6,695,152 | B1 | 2/2004 | Fabrizio et al. | |
| 6,715,621 | B2 | 4/2004 | Boron | |
| 6,722,509 | B1 | 4/2004 | Robertson et al. | |
| 6,745,905 | B2 | 6/2004 | Bernstein | |
| 6,756,975 | B1 | 6/2004 | Kishida et al. | |
| 6,758,349 | B1 | 7/2004 | Kwap et al. | |
| 6,779,670 | B2 | 8/2004 | Primiano et al. | |
| 6,799,523 | B1 | 10/2004 | Cunha | |
| 6,843,382 | B2 | 1/2005 | Kanouchi et al. | |
| 6,860,046 | B1 | 3/2005 | Squitieri | |
| 6,862,896 | B1 * | 3/2005 | Seidl | 62/457.4 |
| 6,867,824 | B2 | 3/2005 | Eiraku et al. | |
| 6,874,646 | B2 | 4/2005 | Jay | |
| 6,902,285 | B2 | 6/2005 | Eiraku et al. | |
| 6,918,736 | B2 | 7/2005 | Hart et al. | |
| 6,919,933 | B2 | 7/2005 | Zhang et al. | |
| 6,929,133 | B1 | 8/2005 | Knapp, III et al. | |
| 6,955,269 | B2 | 10/2005 | Menz | |
| 6,957,941 | B2 | 10/2005 | Hart et al. | |
| 6,962,260 | B2 | 11/2005 | Jay et al. | |
| 6,963,386 | B2 | 11/2005 | Poliakine et al. | |
| 6,964,344 | B1 | 11/2005 | Kim | |
| 6,976,598 | B2 | 12/2005 | Engel | |
| 6,981,597 | B2 | 1/2006 | Cash | |
| 6,991,116 | B2 * | 1/2006 | Johnson et al. | 211/59.2 |
| 7,004,334 | B2 | 2/2006 | Walsh et al. | |
| 7,028,450 | B2 | 4/2006 | Hart et al. | |
| 7,080,969 | B2 | 7/2006 | Hart et al. | |
| 7,083,054 | B2 | 8/2006 | Squitieri | |
| 7,086,541 | B2 | 8/2006 | Robertson | |
| 7,104,026 | B2 | 9/2006 | Welborn et al. | |
| 7,108,143 | B1 | 9/2006 | Lin | |
| 7,150,365 | B2 * | 12/2006 | Hardy et al. | 211/189 |
| 7,152,757 | B2 * | 12/2006 | Huffer et al. | 221/263 |
| 7,182,209 | B2 | 2/2007 | Squitieri | |
| 7,213,722 | B2 * | 5/2007 | Nagelski et al. | 221/246 |
| 7,418,311 | B1 * | 8/2008 | Lagassey et al. | 700/236 |
| 2001/0030197 | A1 * | 10/2001 | Gates et al. | 221/124 |
| 2001/0045403 | A1 | 11/2001 | Robertson | |
| 2002/0066706 | A1 | 6/2002 | Robertson | |
| 2002/0179553 | A1 | 12/2002 | Squitieri | |
| 2002/0182050 | A1 | 12/2002 | Hart et al. | |
| 2002/0189201 | A1 | 12/2002 | Hart et al. | |
| 2002/0189209 | A1 | 12/2002 | Hart et al. | |
| 2003/0007859 | A1 | 1/2003 | Hart et al. | |
| 2003/0080075 | A1 | 5/2003 | Primiano et al. | |
| 2003/0132178 | A1 | 7/2003 | Jay et al. | |
| 2003/0132182 | A1 | 7/2003 | Jay | |
| 2003/0136750 | A1 | 7/2003 | Fujii et al. | |
| 2003/0168420 | A1 | 9/2003 | Primiano | |
| 2004/0004046 | A1 | 1/2004 | Primiano et al. | |
| 2004/0084390 | A1 | 5/2004 | Bernstein | |
| 2004/0094493 | A1 | 5/2004 | Higgins | |
| 2004/0182805 | A1 | 9/2004 | Harper | |
| 2004/0206054 | A1 | 10/2004 | Welborn et al. | |
| 2004/0232092 | A1 | 11/2004 | Cash | |
| 2005/0076817 | A1 | 4/2005 | Boks et al. | |
| 2005/0133471 | A1 | 6/2005 | Squitieri | |
| 2005/0249577 | A1 | 11/2005 | Hart et al. | |
| 2005/0263465 | A1 | 12/2005 | Chung | |
| 2006/0001337 | A1 | 1/2006 | Walburn | |
| 2006/0032827 | A1 | 2/2006 | Phoy | |
| 2006/0104758 | A1 | 5/2006 | Hart et al. | |
| 2006/0131320 | A1 * | 6/2006 | Nagelski et al. | 221/67 |
| 2006/0196840 | A1 | 9/2006 | Jay et al. | |
| 2006/0213852 | A1 | 9/2006 | Kwon | |
| 2006/0263192 | A1 | 11/2006 | Hart et al. | |
| 2006/0283150 | A1 | 12/2006 | Hart et al. | |
| 2006/0283151 | A1 | 12/2006 | Welborn et al. | |
| 2007/0175839 | A1 | 8/2007 | Schneider et al. | |
| 2007/0175844 | A1 | 8/2007 | Schneider | |

* cited by examiner

CYLINDRICAL CONTAINER DISPENSER

BACKGROUND OF THE INVENTION

1. Field of the Invention

The present invention relates to the field of dispensers that may be used in a retail environment.

2. Description of Related Art

As is known, retail stores undergo a continual cycle of having customers remove the products from the shelves and stocking products back on the shelves. Typically the restocking of shelves is done by store employees. In addition to restocking the shelves, in certain settings such as grocery stores, employees regularly go through the store and move the products to the front of the shelves so that consumers can more readily see and reach the products, this action being known as facing the product. While facing may need to be done throughout the day, preferably the restocking can take place less frequently.

As can be appreciated, a shelf with the products faced suggests that all the items are in stock (suggesting a well run store) and also provides an aesthetically pleasing look to the consumer. Unfortunately, facing products on a shelf is a time consuming task and expensive task. Therefore, to reduce the cost, methods of automatically facing products have been developed.

One common method is to use a spring powered pusher that urges products toward the front of the shelf. Typically a single channel is provided that is wide enough to hold a row of product and a spring loaded pusher moves the remaining product forward after a consumer takes one of the items out of the channel. Occasionally the store employees will push the pusher back and load in additional products. Such a system avoids the need to constantly face the products and is effective for certain types of products but is more difficult to use for heaver items. For heavy items a pusher with increased force is needed to overcome the friction force due to the weight of the product, which results in increased force being exerted on the front product making it difficult to remove. Therefore, an improved device that can be used for facing heavy products would be beneficial.

In addition, certain products are more valuable than others. As can be expected, the higher cost items tend to be disproportionately subject to theft. For example, in a grocery store setting containers of baby formula are relatively expensive and thus tend to be subject to theft. The theft of more expensive items has a greater financial impact on the store and, therefore, methods to reduce theft are highly valuable.

To combat theft, some stores lock up more expensive products or place theft deterrent devices on the containers. For example, some grocery stores lock up containers of baby formula. Unfortunately, when a person desires to purchase a product that is locked up the person must seek the assistance of a store employee. This is inconvenient for both the store and the consumer and has a tendency to reduce the volume of sales of product being locked up. Thus, individuals may simply decide not to purchase the product that is locked up or may look for another store that does not lock up the products. This forces stores to decide between locking up the product and hoping the prevented thefts pay for the reduced sales or not locking up the product and hoping the increased sales pay for the higher level of theft. Therefore, a system that can aid in reducing the theft of items, such as containers of baby formula, while still allowing the consumer to quickly obtain the product would be beneficial.

BRIEF SUMMARY OF THE INVENTION

In an embodiment of the present invention, a dispenser includes a housing with an upper opening and a lower opening. The upper opening is connected to the lower opening with a track. The upper opening may be occluded by a cover that may be rotatably mounted to the housing. In the lower opening a drawer is provided to prevent containers placed in the upper opening from rolling out of the lower opening. In an embodiment, when the drawer is opened a single container may be removed and other containers on the track are blocked from reaching the opening by a retaining tab that is coupled to the drawer. In an embodiment, the drawer may be locked with a sliding member. The dispenser may also include a sensor configured to detect the taking of the container.

BRIEF DESCRIPTION OF THE DRAWINGS

The present invention is illustrated by way of example and not limited in the accompanying figures in which like reference numerals indicate similar elements and in which.

Figure 1:
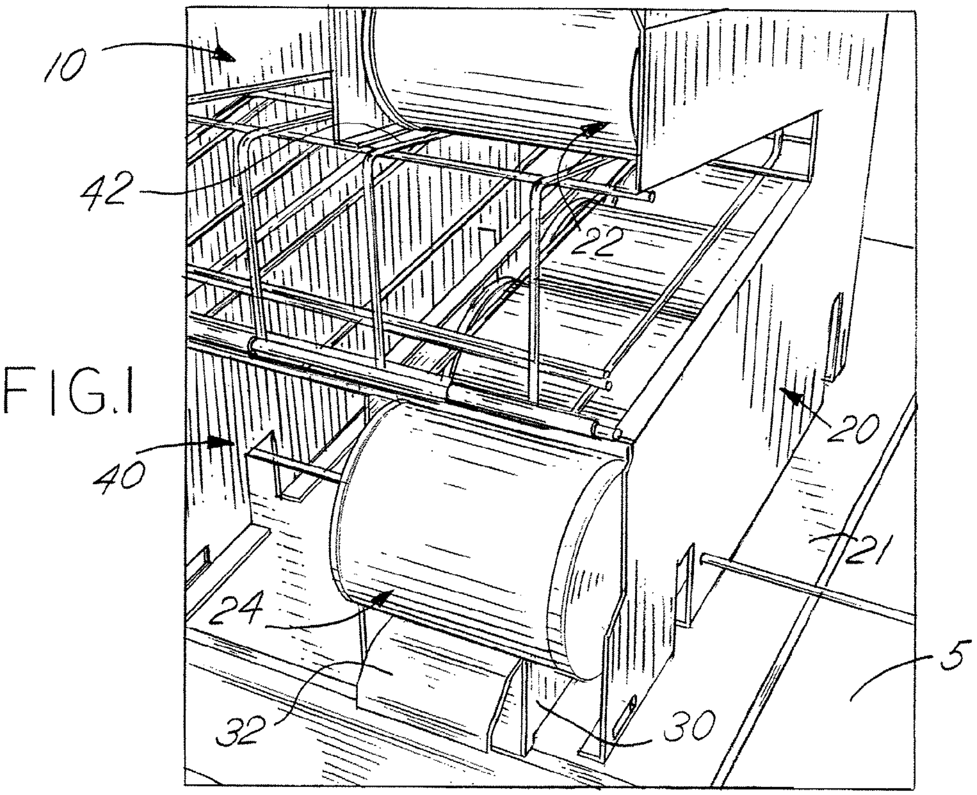
FIG. 1 illustrates a portion of a dispenser in accordance with an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

In the detailed description that follows, various components are mounted or supported by other components. Unless otherwise noted, these components may be directly or indirectly supported or mounted and this disclosure is not intended to be limiting in this regard. The use of the term "mount," "mounted," "mounting," "support" or "supporting" is meant to broadly include any technique or method of mounting, supporting, attaching, joining or coupling one part to another, whether directly or indirectly. In addition, various components are described individually. It is noted that these components may be combined as appropriate to aid in the assembly or manufacturing process and unless otherwise noted this disclose is not intended to be limiting in this regard.

It is noted that various components are referred as moving between positions. It should be noted that the term movement as used herein refers to any type of movement such as displacement, translation, sliding, rotating and orientation changes and unless otherwise noted this disclosure is not intended to be limiting in this respect.

It is noted that communication connections between components are disclosed below. The connections may be direct, indirect, wired or wireless and this disclosure is not intended to be limiting in this respect unless otherwise noted.

Figure 2:
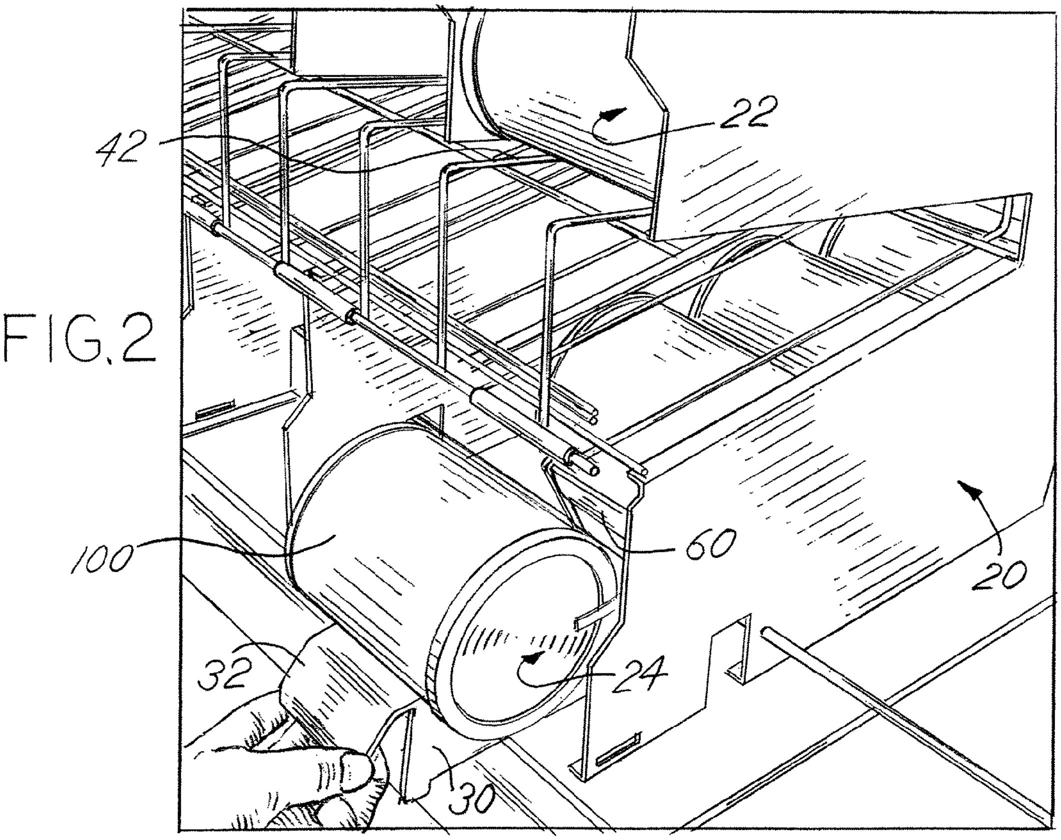
FIG. 2 illustrates the dispenser depicted in FIG. 1 with a drawer open in accordance with an embodiment of the present invention.

Looking at FIGS. 1 and 2, an exemplary embodiment of a dispenser 10 is illustrated. As depicted, the dispenser 10 includes a housing 20 mounted on a based 21. The base 21 may be mounted on a support surface 5, which may be a shelf. The housing 20 includes an upper opening 22 and a lower opening 24.

It should be noted that the dispenser 10 and the components positioned within and attached to may be provided in any suitable material such as, but not limited to, metal or plastic. Furthermore, the various components may range in size as desired. In an embodiment, the materials may be coated so as to provide a desirable finish in a known manner. Depending on volume and manufacturing considerations, the various components may be, without limitation, molded, formed, shaped or machined as appropriate. As manufacturing of the illustrated components is known, additional discussion regarding the manufacturing processes is not provided.

Figure 4:
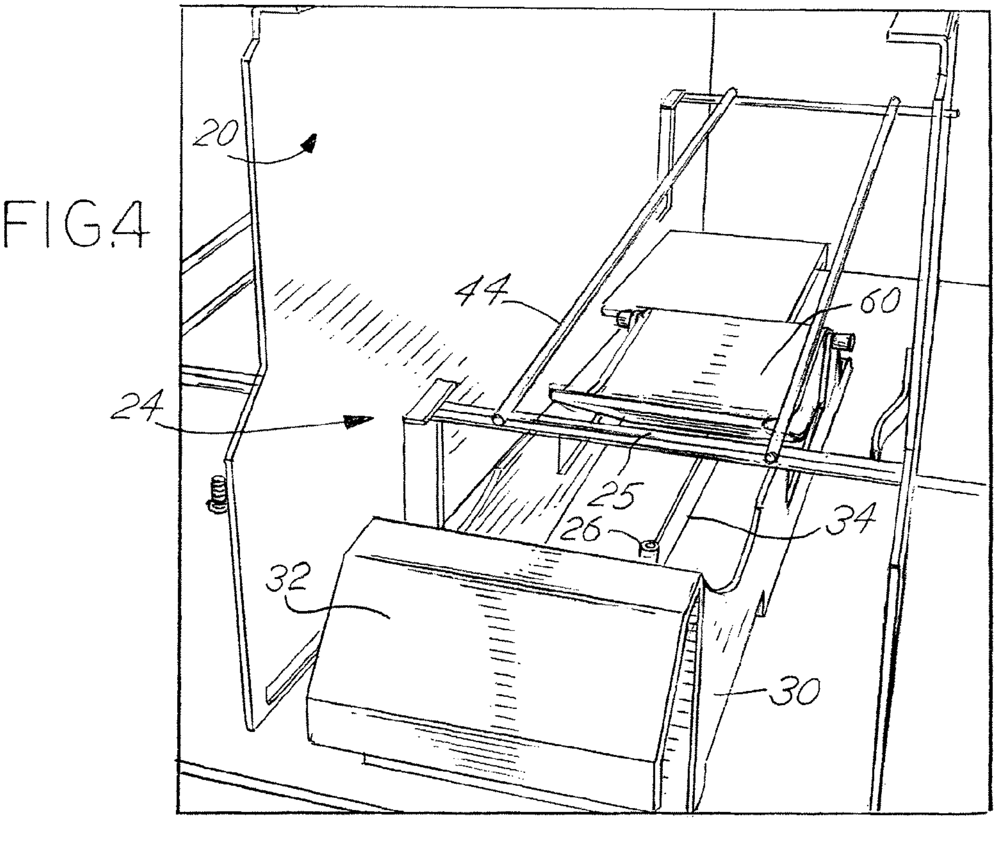
FIG. 4 illustrates a lower portion of a track in a dispenser in accordance with an embodiment of the present invention.

Connecting the upper opening 22 to the lower opening 24 is a track 40. As depicted, the track 40 includes an upper portion 42 and a lower portion 44 (FIG. 4). As depicted, the track 40 is configured to hold a number of cylindrical containers 100, which for example, may be containers of formula. Cylindrical containers of other substances may also be held and dispensed. In operation, a cylindrical container 100 may be placed in the upper opening 22 and due to the force of gravity, the container 100 travels along the track 40 until it reaches the lower opening 24.

Positioned in the lower opening 24 is a drawer 30 that may include a lip 32. The drawer 30 may be positioned in a first closed position as illustrated in FIG. 1 or may be moved to a second open position as depicted in FIG. 2. As depicted, when the drawer 30 is in the first closed position the cylindrical containers 100 may not be removed from the opening 24. However, when the drawer 30 is moved to the second open position the cylindrical container 100 may be removed.

Figure 3:
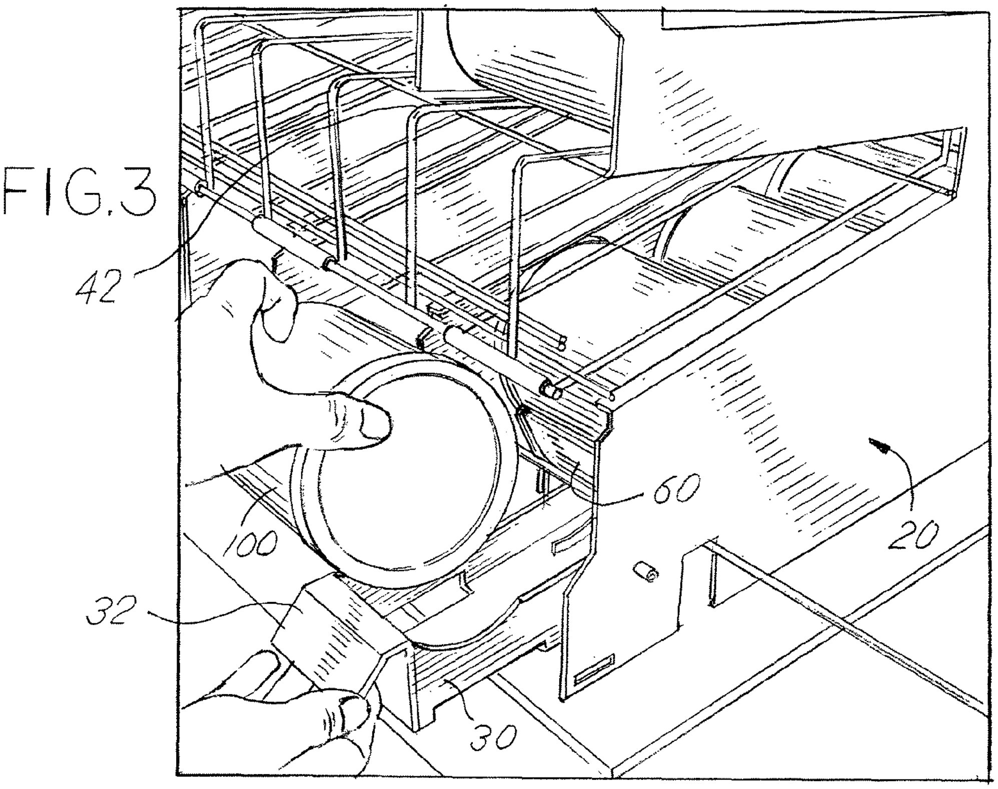
FIG. 3 illustrates the dispenser depicted in FIG. 1 with a container being removed in accordance with an embodiment of the present invention.

FIG. 3 illustrates the container 100 being removed from the drawer 30. As depicted, however, only one container 100 may be removed when the drawer 30 is moved. To prevent additional containers 100 from rolling along the lower portion 44 of the track 40 toward the lower opening 24, a retaining tab 60 may be provided. The retaining tab 60 is configured to move into a blocking position in response to the drawer 30 moving to the second open position. Thus, as depicted, either the drawer 30 and/or the retaining tab 60 prevent the continual removal of the containers 100 from the lower opening 24.

Turning to FIG. 4, an embodiment of a portion of the dispenser 10 is illustrated. As depicted, the lower portion 44 of the track 40 ends at the lower opening 24 of the housing 20. The drawer 30 is positioned in the lower opening 24 and extends underneath the lower portion 44. To guide the movement of the drawer 30, a slot 34 may be provided in the drawer 30 that is configured to slide along one or more guide posts 26. As depicted, the retaining tab 60 is resting on a cross bar 25, the function of which will be described below in greater detail.

Figure 5:
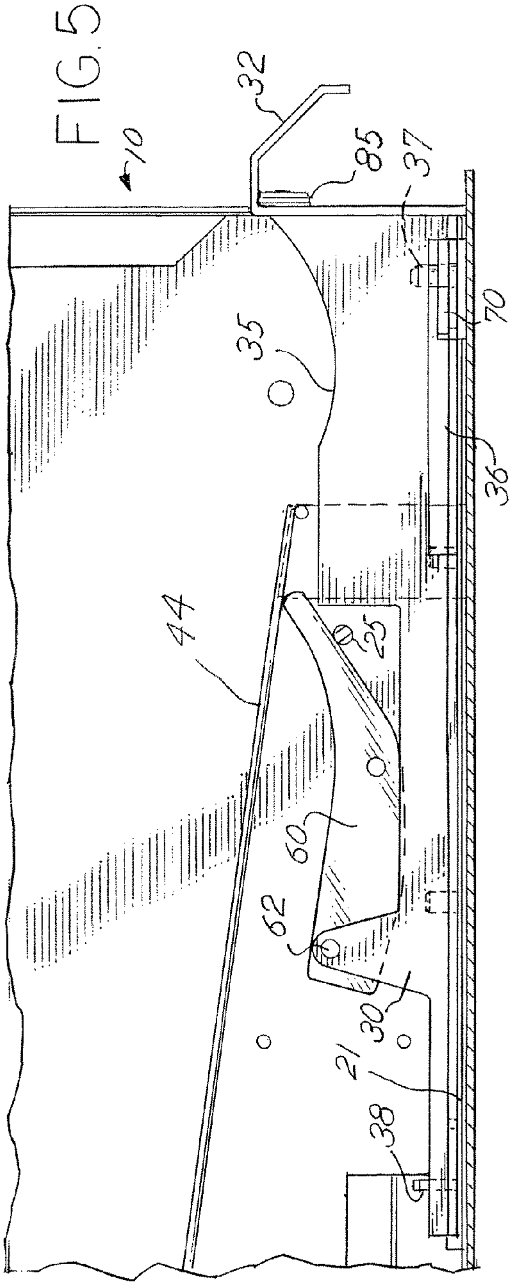
FIG. 5 illustrates a side view of an embodiment of a dispenser with a drawer in a first position in accordance with an embodiment of the present invention.

Looking now at FIG. 5, a side view of an embodiment of the dispenser 10 is illustrated. As depicted, the drawer 30 is mounted on the base 21. The drawer 30 is coupled to the retaining tab 60 and is shown in a first closed position. The drawer includes a concave surface 35 for supporting a container 100 (FIG. 2). The drawer also includes a stud 38 and a stud 37 positioned in a channel 36. Also shown in the channel 36 is a sliding member 70. Mounted to the dispenser is a lock cylinder 85, more of which will be mentioned below.

As illustrated in FIG. 5, the retaining tab 60 is rotatably coupled to the drawer 30 with the fastener 62, rests on the cross bar 25, and is positioned below the lower portion 44. Thus, as illustrated, the container 100 placed on the lower portion 44 could roll past the retaining tab 60 and would stop when the container 100 came to rest against the drawer 30. If a second container 100 was placed on the lower portion 44 it could come to rest above the retaining tab 60.

Figure 6:
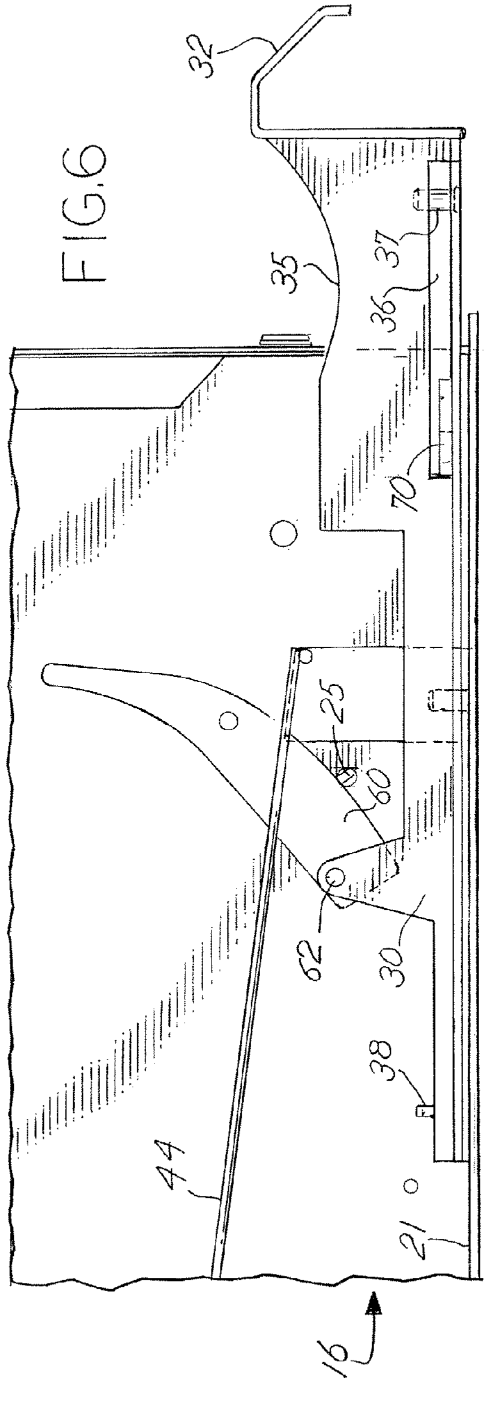
FIG. 6 illustrates a side view of the embodiment depicted in FIG. 5 with the drawer in a second position in accordance with an embodiment of the present invention.

Looking next at FIG. 6, the embodiment depicted in FIG. 5 is illustrated with the drawer 30 shown in an open position. As can be appreciated, the retaining tab 60 is rotated upward by the cross bar 25 and the forward movement of the drawer 30. Thus, when the drawer 30 is opened the retaining tab 60 rotates about the fastener 62 and extends above the lower portion 44 in the blocking position. As can be appreciated, the sliding member 70 is now located on the opposite end of the channel 36 and the stud 37 is no longer approximate the sliding member 70. Thus, the stud 37 and the stud 38 have been moved in a direction extending from a rear 16 of the dispenser 10 towards a front 15 of the dispenser 10.

As depicted in FIG. 6, if a container 100 was resting against the concaved surface 35 of the drawer 30, the container 100 could be removed. However, the retaining tab 60 will prevent additional containers 100 from rolling down the lower portion 44 until the drawer 30 is moved back into the first position.

Thus, the depicted design allows a single container 100 to be removed from the dispenser 10 each time the drawer 30 is moved from the first position to the open position.

Figure 7:
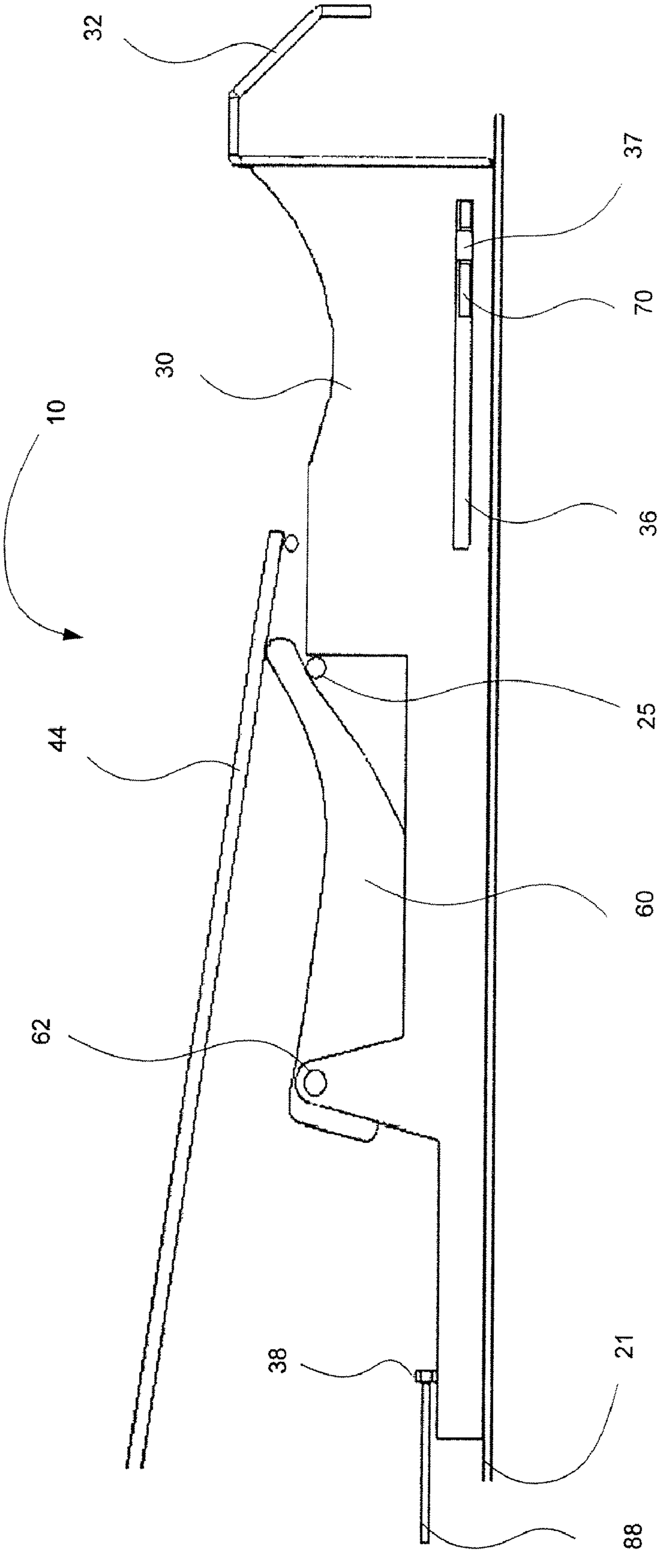
FIG. 7 illustrates a simplified cross-sectional view of a dispenser in accordance with an embodiment of the present invention.

FIG. 7 illustrates a partial cross-section view of an embodiment of the dispenser 10 with the drawer 30 in a closed position. As depicted, attached to the stud 38 is a spring element 88. In an embodiment, the spring element 88 will cause the drawer 30 to move back to the illustrated closed position. In other words, movement of the drawer 30 from the first position toward the open position will increase the potential energy of the spring element 88 and once the user releases the drawer 30 the spring element 88 will cause the drawer 30 to move back to the first position.

It should be noted that while the spring element 88 is depicted mounted to the stud 38, in an alternative embodiment (not shown) the spring element could be mounted between the retaining tab 60 and the drawer 30. In such an embodiment, the spring element would oppose the rotation of the retaining tab 60 and when released would cause the drawer 30 to return to the closed position. Numerous other methods of using a spring element 88 are possible and the spring element 88 could be some other configuration such a coil spring, a leaf spring or any other known shape of spring. The advantage of mounting the spring element 88 to the stud 38 is that typical springs configured for such use are relatively inexpensive and such a design is simple to install and repair should the spring element 88 wear.

Figure 8:
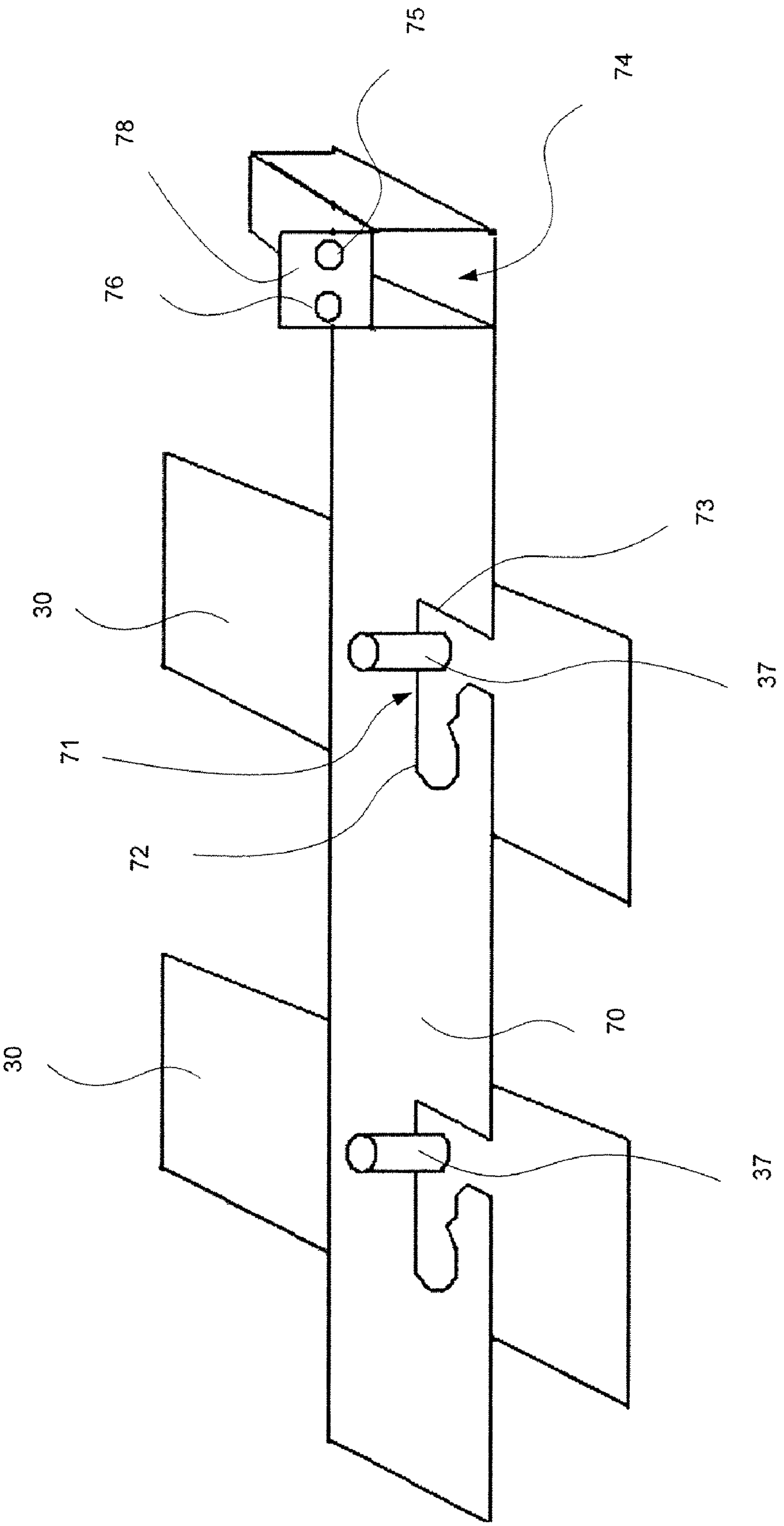
FIG. 8 illustrates a simplified partial view of an embodiment of a sliding member engaging a drawer in a first position in accordance with an embodiment of the present invention.

Looking next at FIG. 8, a simplified view of the interaction between the sliding member 70 and the drawer 30 is illustrated. As depicted, the sliding member is in a first position. Thus the open end 73 of notch 71 is aligned with the stud 37 of the drawer 30. Thus, in this first position, the drawer 30 may be moved and during the movement the stud 37 will exit the notch 71.

Figure 9:
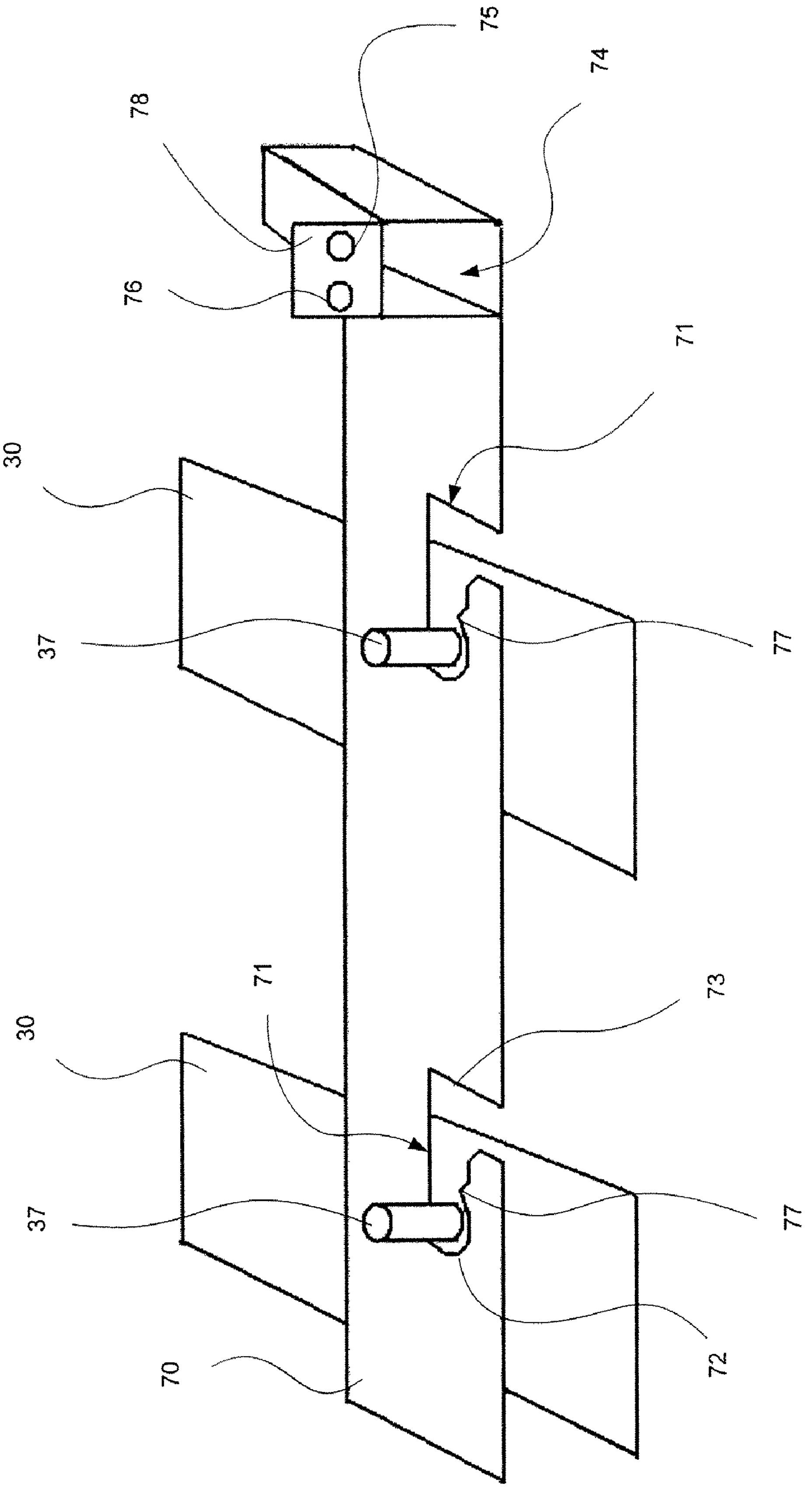
FIG. 9 illustrates the embodiment depicted in FIG. 8 with the sliding member in a second position in accordance with an embodiment of the present invention.

Turning to FIG. 9, the sliding member 70 is positioned in a second position. As can be appreciated, the closed end 72 of the notch 71 is aligned with the stud 37. To help ensure the sliding member 70 does not inadvertently move, a lip 77 may be provided on the notch 71. The geometry of the lip 77 will help ensure that forces exerted on the drawer 30 while the sliding member is in the second position will act to cause the sliding member 70 to stay in the second position.

As depicted in FIGS. 8 and 9, the sliding member 70 includes a chamber 74, and a tab 78 positioned above the chamber 74, with a first aperture 75 and a second aperture 76. More will be said about the first and second apertures 75, 76 below.

In should be noted that while portions of two drawers 30 are illustrated in FIGS. 8 and 9, in alternative embodiments more or fewer drawers 30 may be controlled with the sliding member 70. To control the movement of additional drawers 30, the sliding member 70 may be lengthened and additional notches 71 may be added. To control a single drawer 30, one of the notches 71 may be removed. It should also be noted that if it was desired to have the movement of one of the depicted drawers 30 not be controlled by the sliding member 70, the appropriate stud 37 may be omitted.

Figure 10:
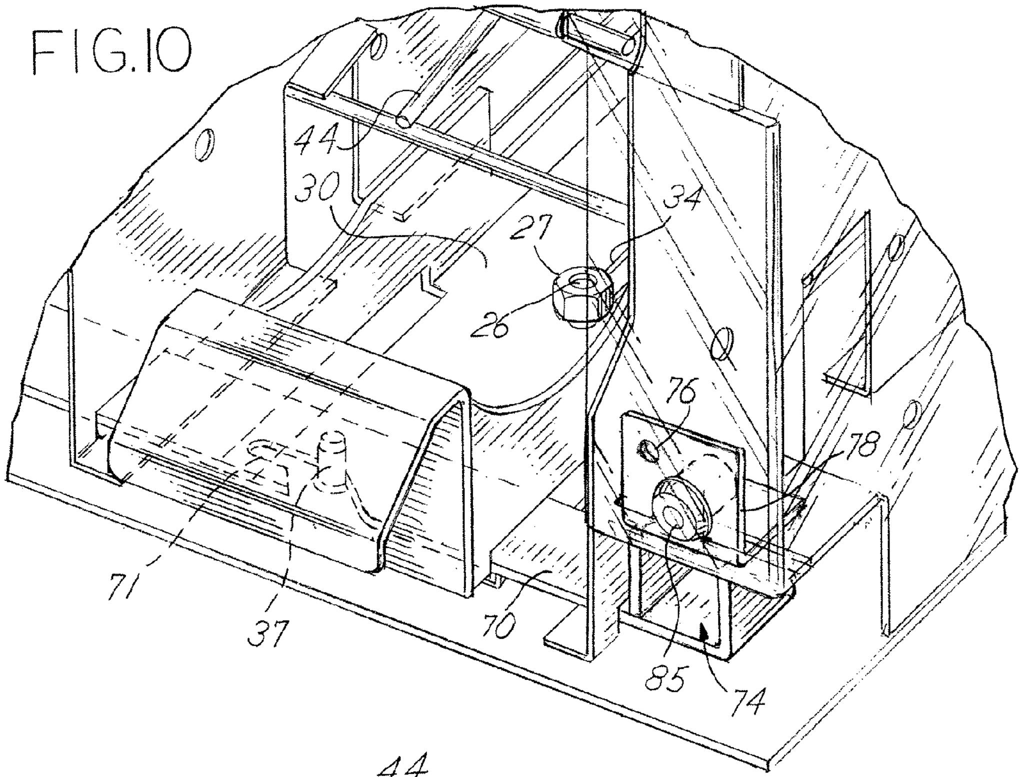
FIG. 10 illustrates a partial cutaway view of a dispenser in accordance with an embodiment of the present invention.
Figure 11:
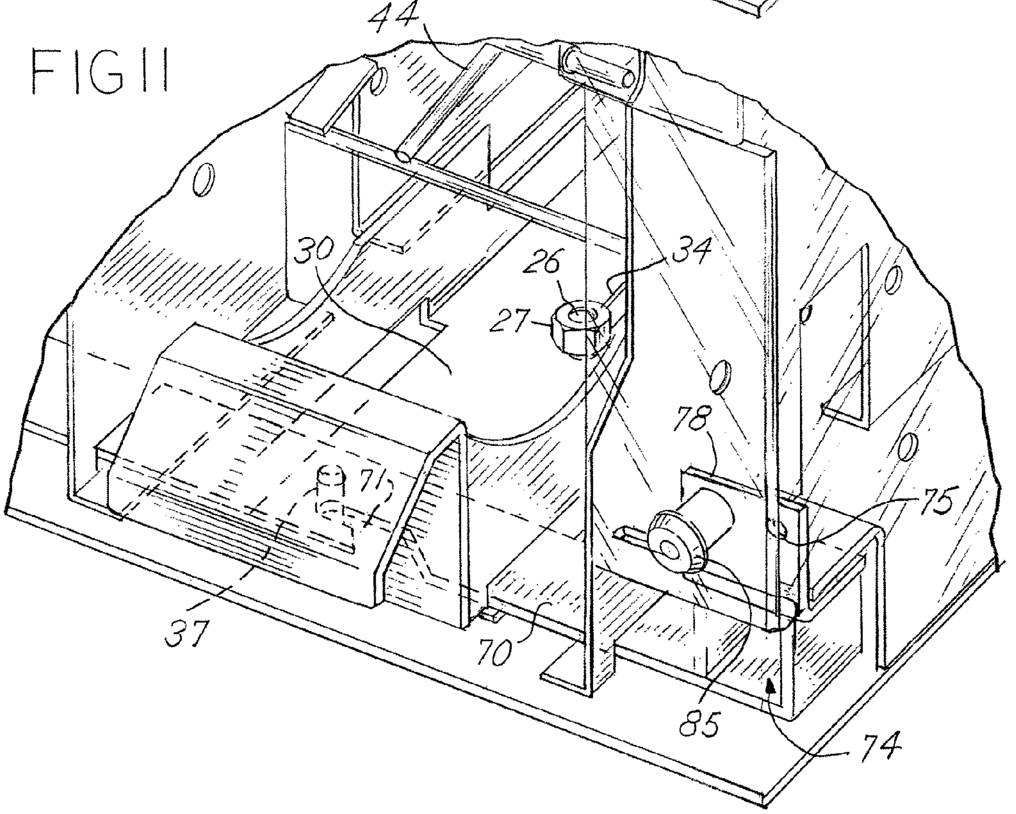
FIG. 11 illustrates the dispenser depicted in FIG. 10 with the sliding member in a second position in accordance with an embodiment of the present invention.

FIGS. 10 and 11 illustrate an embodiment of the sliding member 70 positioned in the dispenser 10. As depicted, the drawer 30 is in the first or closed position in the lower opening 24 (FIG. 2). The stud 37 is mounted on the drawer 30 and the sliding member 70 is positioned so that the slot 71 is aligned with the stud 37. As depicted in FIG. 10, the open end 73 (FIG. 8) is aligned with the stud 37, thus the drawer 30 may be moved to the open position.

To hold the sliding member 70 in the first position, the lock cylinder 85 may engage the first aperture 75 (FIG. 9) on the tab 78 of the sliding member 70. Thus, the first aperture 75 is not visible because it is engaged by the lock cylinder 85 and the second aperture 76 is not engaged and is visible. Holding the sliding member 70 in the first position ensures that individuals wanting to purchase or obtain one or more of the containers position in the dispenser may do so by opening the drawer 30 one or more times. As previously discussed, to ensure the drawer 30 moves properly, one or more guides 26 may engage the slot 34. A fastener 27 may be mounted to the guide 26 so as to ensure the drawer 30 does not become disassembled during use.

As can be appreciated, while the dispenser 10 is provided to dispense products, there are times when it is undesirable to dispense products. For example, if the retail store closes there is no need to dispense products. However, if the dispenser is able to dispense products while the store is closed, it is possible that an employee may use the opportunity to take a container without paying for it. While more difficult to quantify, it is believed that employee theft is a significant factor in the overall losses generated by theft and therefore methods to block or prevent such theft are helpful.

To prevent the movement of the drawer 30 so as to allow the taking of a container 100 (FIG. 2), the sliding member 70 may be positioned in a second position as depicted in FIG. 11. As depicted, the lock cylinder 85 is engaging the second aperture 76 rather than the first aperture 75 as in FIG. 10 and therefore the first aperture 75 is visible and the second aperture 76 is not visible. The closed end 72 (FIG. 8) of the notch 71 is now aligned with the stud 37 and therefore the drawer 30 may not be moved toward the open position.

In an embodiment, the dispenser 10 may be locked by moving the sliding member 70 from the first position to the second position. To do this, the lock cylinder 85 may be removed and a tool or an individual's finger may be placed in the chamber 74 and the sliding member 70 slid to the second position. The lock cylinder 85 may then be reinstalled and the sliding member 70 will be held in place and the drawer 30 will not move. Thus, individuals are prevented from opening the drawer 30 to remove containers 100 contained within the dispenser 10. Thus, in an embodiment, greater control over when the dispenser 10 may be used is provided.

As can be appreciated, if a plurality of tracks are provided in a row in the dispenser 10, a single sliding member 70 may be used to control the access to all the tracks. Thus, in an embodiment, it is relatively simple to lock or unlock a plurality of drawers 30.

Figure 12:
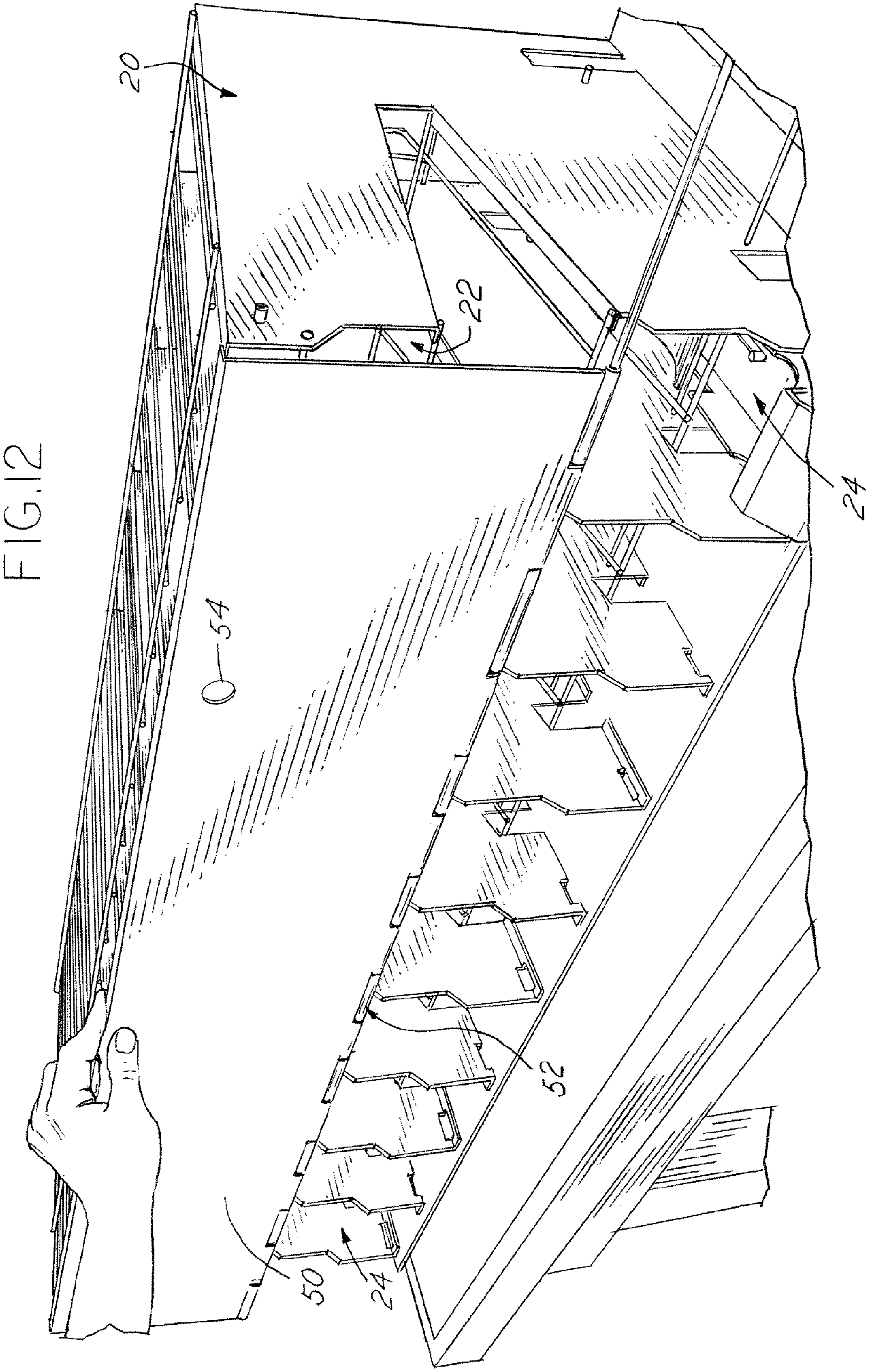
FIG. 12 illustrates an embodiment of a dispenser with a cover in accordance with an embodiment of the present invention.

Turning to FIG. 12, an embodiment of the dispenser 10 is illustrated. As depicted, nine tracks 40 (FIG. 13) are positioned within the housing 20, thus there are nine lower openings 24 visible. It should be noted that some other number of openings such as more than nine or less than nine may also be provided. It is further noted that while as depicted the lower openings 24 are similarly sized, in an embodiment the size of the lower openings 24 (along with the associated tracks 40 and the associated upper openings 24) may be varied so as to accommodate different sized containers 100 in the same dispenser 10.

As depicted, a cover 50 is rotatably mounted to the housing 20 via the hinge 52 and is in a closed position. In addition, an aperture 54 is provided in the cover 50. While not required, the aperture 54 may be configured to accept a lock (not shown) that allows the cover 50 to be locked. While other methods of mounting the cover 50 are possible, an advantage of the depicted method is that the cover 50 may be unlocked and opened with a single hand. This can be advantageous for an employee that is carrying something in the other hand. The depicted method is also useful for employees that have physical disabilities or injuries that prevent them from using both hands.

Figure 13:
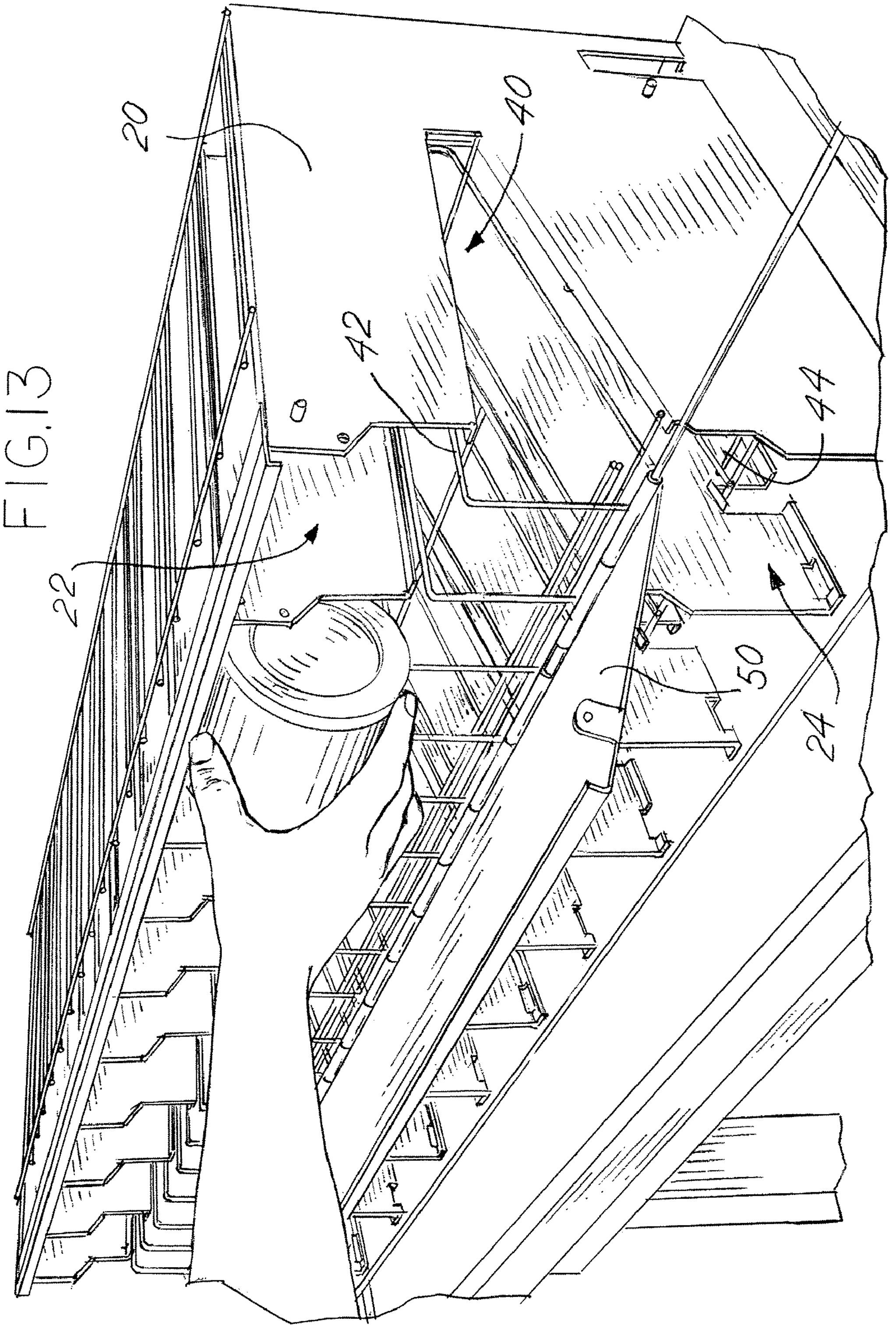
FIG. 13 illustrates the dispenser of FIG. 12 with the cover open in accordance with an embodiment of the present invention.

FIG. 13 illustrates the cover 50 in an open position. As depicted, the cover 50 may be rotated from the closed position to the open position. This allows access to the upper openings 22 and thus containers 100 may be placed in the upper openings 22 so that the stock of containers 100 may be replenished. As depicted, a container placed in the upper opening 22 will travel along the track 40 until it reaches the drawer 30 in the lower opening 24.

It should be noted that if the cover 50 is locked in the closed position as shown in FIG. 12, individuals will not be able to take containers out of the upper openings 22 of the dispenser 10. If the cover 50 is locked in conjunction with locking the drawers 30, the dispenser 10 depicted in FIGS. 12 and 13 allows access to the containers within the dispenser 10 to be controlled.

Figure 14:
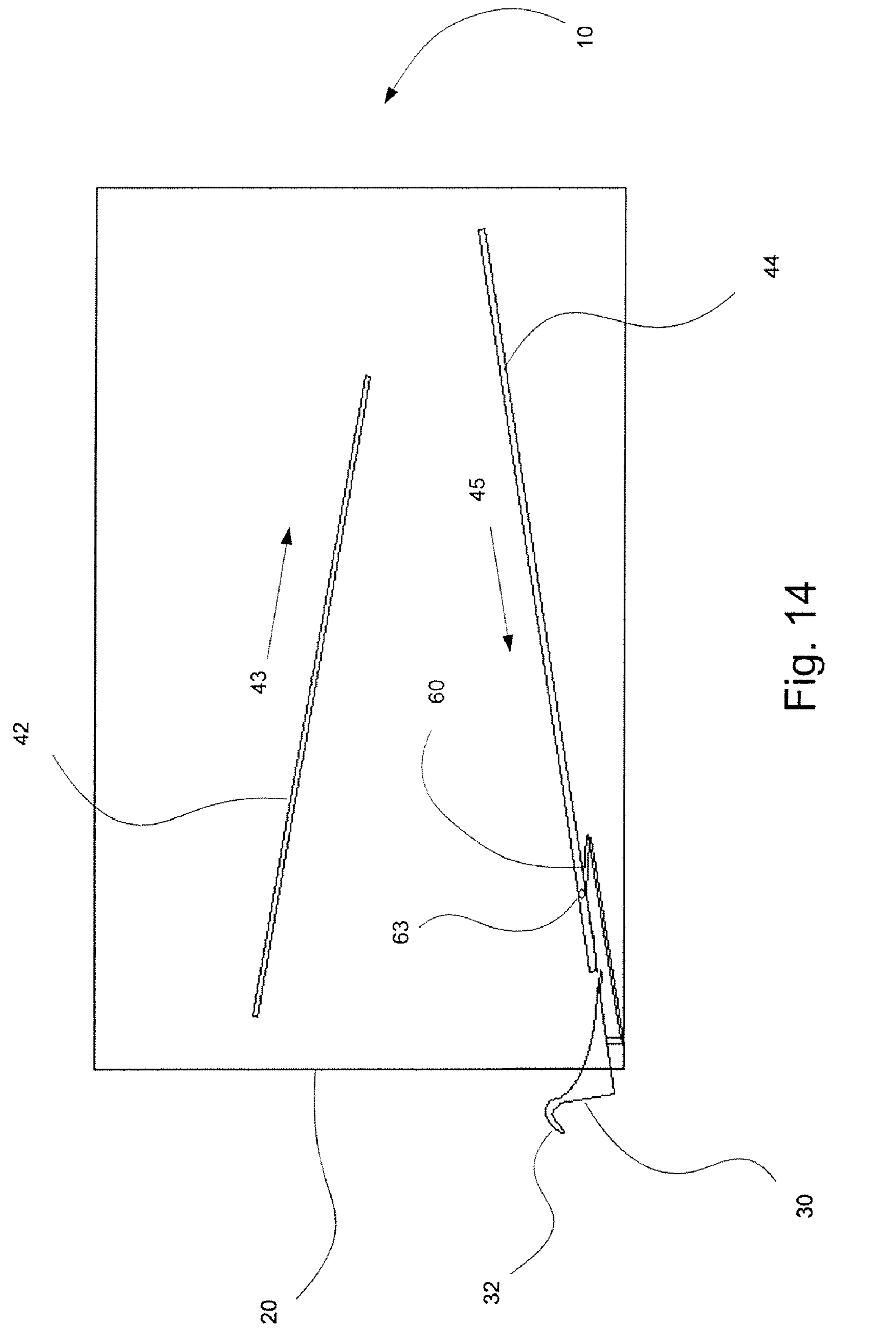
FIG. 14 illustrate an alternative embodiment of a drawer linked to a retaining tab in accordance with an embodiment of the present invention.
Figure 15:
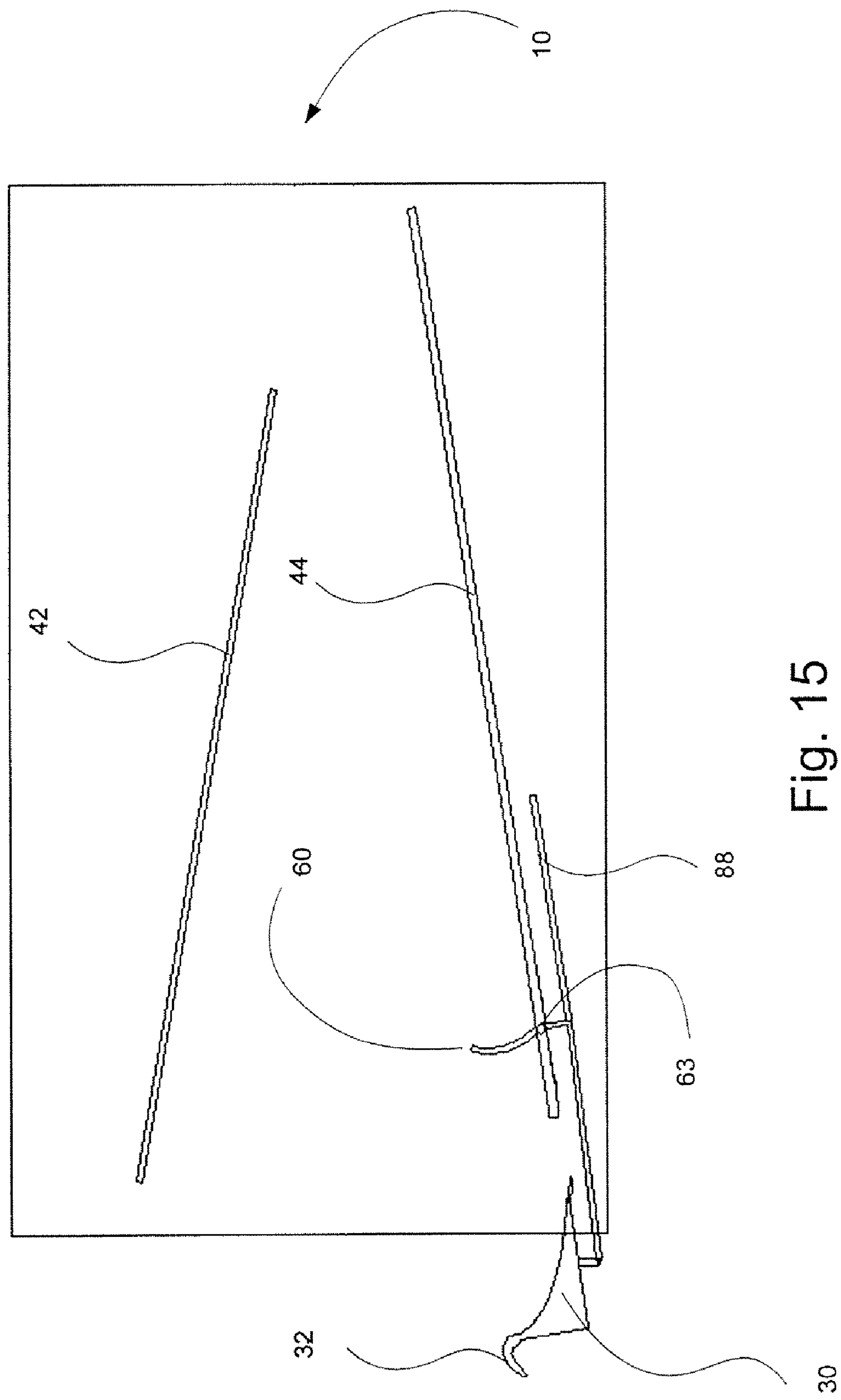
FIG. 15 illustrates the embodiment depicted in FIG. 14 with the retaining tab in a blocking position in accordance with an embodiment of the present invention.

Turning to FIGS. 14 and 15, a simplified cross-sectional view of an embodiment of the dispenser 10 is depicted. An outline of an embodiment of the housing 20 is illustrated with a drawer 30 extending beyond the outer boundary of the housing 20. The drawer 30 includes the lip 32 that may be used as an aid to moving the drawer 30 from the closed or first position shown in FIG. 14 to the open or second position shown in FIG. 15.

As depicted, the dispenser 10 includes the track 40 with the upper portion 42 and the lower portion 44. A cylindrical container 100 placed on its side on the upper portion 42 will roll along down the upper portion 42 in a first direction 43 until it reaches the end of the upper portion 42. The container 100 will then roll along the lower portion 44 in a second direction 45 until it reaches the drawer 30. The drawer 30 occludes the lower opening 24 (FIG. 12) and therefore prevents the container 100 from rolling out of the dispenser 10. To aid in positioning the drawer 30, the spring element 88 as shown in FIG. 15 may be provided to resist movement of the drawer 30.

As can be appreciated from FIGS. 14 and 15, the movement of the drawer 30 causes the retaining tab 60 to rotate. However, unlike the embodiment depicted in FIG. 7, for example, the retaining tab 60 rotates about a pivot joint 63 that is supported by the housing 20 rather than the drawer 30. Thus, in the depicted embodiment, the retaining tab 60 does not actually move in the second direction 45 but instead rotates about the pivot joint 63. It should be noted that one disadvantage to the system disclosed in FIGS. 14 and 15 is that the pure rotation of the retaining tab 60 may cause a force to be exerted on the containers resting on the lower portion 44 of the track 40. However, a possible advantage of the embodiment disclosed in FIGS. 14 and 15 is that potential wear caused by sliding the retaining tab 60 over the cross bar 25 may be reduced.

FIGS. 14 and 15 also depict an embodiment of the upper and lower portions 42, 44 of the track 40. As can be appreciated, if the dispenser 10 is mounted on a flat mounting surface, the second direction 45 needs to be configured at an angle so that the track will direct the containers 100 to the front of the dispenser 10 if gravity is to be used to direct the containers 100. If the second direction 45 is too close to horizontal then the containers 100 will not tend to roll down the second portion 44 of the track 40. If the second direction 45 is too steep than the height of the dispenser 10 will have to increase in order to hold a reasonable number of containers 100. The same is also true for the first direction 43. Therefore, a track 40 having an incline of about 5 to 15 degrees may be useful.

As can be appreciated from FIG. 14, the first direction 43 is not quite 180 degrees different from the second direction 45. However, the first direction 43 is more than 90 degrees different from the second direction 45. If the first direction 43 is less than 90 degrees different from the second direction 45 than the height of the dispenser 10 will undesirably increase if the dispenser 10 is going to be capable of holding a sufficient number of containers 100 and the dispenser 10 will take up more space than desired. On the other hand, the dispenser 10 will not function properly if the first and second directions 43, 45 are 180 degrees apart. Therefore, in an embodiment the angular difference between the first direction 43 and the second direction 45 may be between 90 degrees and about 175 degrees. In an embodiment, the angular difference between the first and second directions 43, 45 may be about 160-170 degrees with both the first and the second direction 43, 45 being about 5-10 degrees from horizontal so that the first direction 43 is substantially opposite the second direction 45.

As can be appreciated from FIGS. 14 and 15, one advantage of the optional split track is that it allows a number of containers 100 to be positioned within the dispenser 10 without requiring the housing 20 to be excessively tall. Thus, the dispenser 10 may be configured to fit on a shelf.

It should be noted that other mechanisms for moving the drawer 30 such as rotating it open are also possible and considered within the scope of the invention. The advantage of the embodiments depicted is that it is relatively easy to prevent the drawers 30 from moving. However, the drawer 30 could also rotate open in an alternative embodiment not shown. The retaining tab 60, if provided, could be coupled to the rotating drawer 30 in a known manner.

Figure 16:
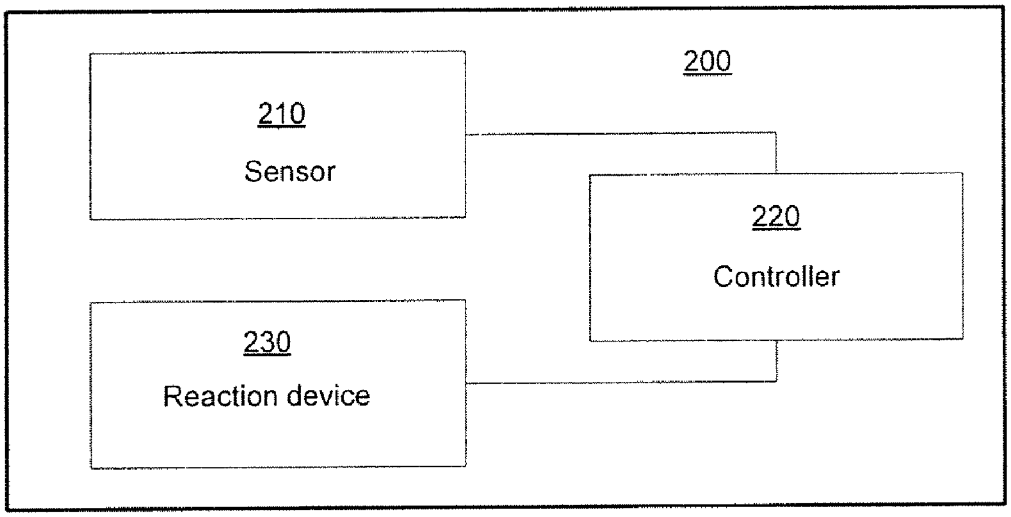
FIG. 16 illustrates a schematic depiction of a detection device in accordance with an embodiment of the present invention.

Turning next to FIG. 16, a detection device 200 is provided. The detection device 200 includes a sensor 210 for detecting the opening of the drawer 30 (e.g. the movement of the drawer 30 from a first position to a second position). The detection device 200 may also include a controller 220 and a reaction device 230. In an embodiment, these devices may be combined into a single integrated chip. In an alternative embodiment, each of the devices may be separate stand alone devices. In another alternative embodiment, the controller 220 and the reaction device 230 may be omitted from the detection device 200.

The sensor 210 may be any type of device that can sense movement of one or more drawers 30. For example, if a circuit was connected to all the drawers 30, movement of any one of the drawers 30 could open the circuit and trigger the sensor 210. In an alternative embodiment, the sensor 210 may include a physical switch that is activated by movement of one or more of the drawers 30. In another alternative embodiment, the sensor may detect the movement of the container(s) containing an Radio Frequency Identification ("RFID") tag. An advantage of sensing RFID tags is that the RFID sensor may be used to assist in the tracking of the container's movement from the dispenser to the checkout line or store exit. As there are numerous variations in sensor technology, other types of sensors may also be used and are considered within the scope of this invention.

The reaction device 230 may be any type of device that provides a reaction in response to receiving a signal from the sensor 210, which may or may not be provided through the controller 220. For example, the reaction device 230 may be a tone generator. The reaction device may also be some sort of communication device that communicates with a remote device.

The controller 220 may be any type of analog or digital circuit that is used to provide a signal in response to a particular action taking place. For example, the controller 220 may include a timer that sends a signal to the reaction device 230, if included, only if the sensor 210 detects that one or more of the drawers 30 are open for an extended period of time or if one or more drawers 30 are opened more than a predetermined number of times within a period of time. As the use and design of controllers 220 is known, no additional discussion will be provided.

Figure 17:
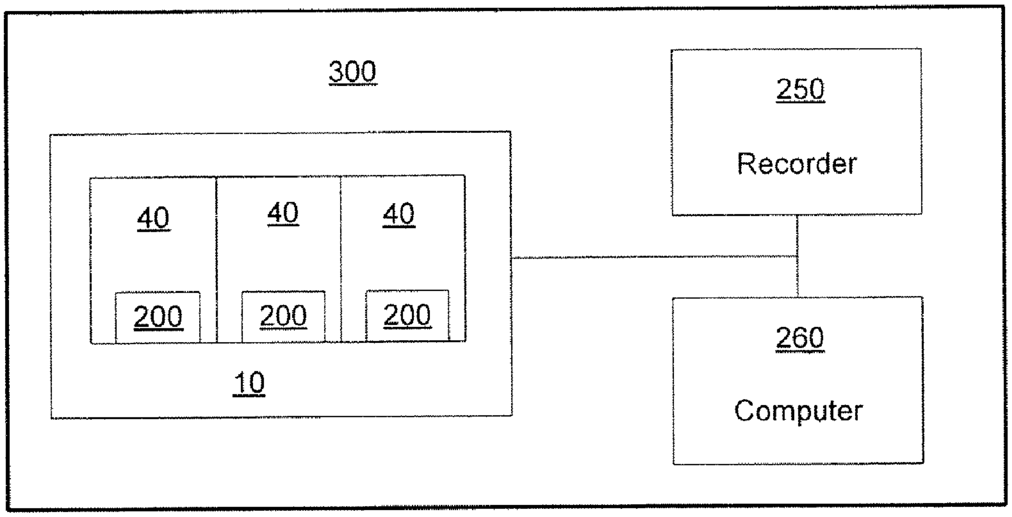
FIG. 17 illustrates a schematic depiction of a theft deterrence system in accordance with an embodiment of the present invention.

FIG. 17 illustrates a schematic of a theft deterrence system 300. As depicted, the theft deterrence system 300 includes a dispenser 10 with several tracks 40 mounted within the dispenser 10. In an alternative embodiment more or less tracks may be provided. Each of the tracks 40 includes a detection device 200. The theft deterrence system 300 may also include one or more monitoring devices such as either a recorder 250 or a computer 260. When the appropriate action takes place, one or more of the detection devices 200 may provide a signal to the monitoring device.

In an embodiment, the detection device 200 will provide a signal to the computer 260, which will in turn send a signal to the recorder 250. The recorder 250, which may be a video camera or some other similar type of data recording device such as a camera, may then record video of the dispenser. In this manner, activity that suggests a theft may be recorded by the recorder 250 so as to make it easier to determine whether the action that triggered the detection device 200 was actually a theft.

If the movement of RFID tags is sensed, the tag number could be provided to the computer 260 to aid in the tracking of the movement of the container 100.

In an embodiment, the triggering of the detection device 200 may cause the recorder 250 to stream video to the computer 260, and the streamed video may be saved in a file with a time and date stamp. The streaming may be down in a wired or wireless manner. Store personnel could then review the video to see if the person triggering the detection device 200 was acting in a suspicious manner. To save space, the video could be saved to a hard disk drive in an encoded format that compresses the video signal. To further save memory space, the data could be saved in a circular buffer so that after a certain time the newest data would overwrite the oldest data.

The detection device 200 could also provide a signal to other components such as sending a signal to an in-store personal's personal digital assistant or by paging security personal. It should be noted that the signals from the detection device 200 could be provided over a wired or wireless medium.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

We claim:

1. A system for dispensing cylindrical containers, comprising:

a housing configured to mount to a shelf, the housing having a base and a plurality of upper openings and a plurality of lower openings;

a plurality of tracks positioned in the housing, wherein each of the plurality of tracks connects one of the upper openings to one of the lower openings;

a plurality of drawers, wherein one of the plurality of drawers is positioned in each of the lower openings, the plurality of drawers being slidable between a closed position and an open position in a horizontal direction along a surface of the base;

a plurality of retaining tabs, each one of the plurality of retaining tabs coupled to one of the plurality of drawers, wherein sliding one of the plurality of drawers causes the associated retaining tab to translate to a blocking position, wherein the associated retaining tab extends through an opening in one of the plurality of tracks in the blocking position; and a sensor configured to detect a change in position of one of the plurality of drawers.

2. The system of claim 1, further comprising a plurality of spring elements, wherein each one of the plurality of drawers is supported in the closed position by one of the spring elements.

3. The system of claim 1, further comprising a sliding member, wherein the sliding member is configured to allow the plurality of drawers to open when in a first position and to prevent the plurality of drawers from opening when in a second position.

4. The system of claim 1, further comprising a cover mounted to the housing, the cover configured to occlude the plurality of upper openings.

5. The system of claim 1, further comprising a tone generator connected to the sensor, wherein opening one of the plurality of drawers causes the tone generator to generate an audible tone.

6. The system of claim 1, further comprising a controller configured to transmit a signal from the sensor to a monitoring device, whereby the area may be monitored when the drawer is opened.

7. A method of dispensing cylindrical containers in a retail environment, the method comprising:

(a) placing a plurality of cylindrical containers in a first opening of a housing;

(b) directing the plurality of cylindrical containers along a track to a second opening;

(c) providing a single cylindrical container in response to a sliding of a drawer mounted in the second opening in a horizontal direction along a surface of the housing by associating the drawer with a retainer tab located approximately one diameter of the cylindrical container away from the drawer and positioning the retainer tab in a blocking position, where the retainer tab extends through an opening in the track, when the drawer is moved;

(d) providing a reaction in response to the sliding of the drawer comprising:

(i) generating a signal representing the opening of the drawer; and (ii) providing the signal over a network connection to a monitoring device; and (e) automatically closing the drawer.

8. The method of claim 7, wherein the providing the reaction in (d) comprises:

(i) generating a tone while the drawer is opening.

9. The method of claim 7, wherein the directing in (b) comprises:

(i) directing the cylindrical containers along an inclined first portion of the track in a first direction; and (ii) directing the cylindrical containers along an inclined second portion of the track in a second direction, the second direction being more than 90 degrees different from the first direction, whereby the first and second portion provide a compact method of storing the plurality of containers.

10. The method of claim 7, wherein the placing of containers in the opening in (a) comprises:

(i) unlocking a cover occluding the first opening;

(ii) rotating the cover so as to allow access to the first opening; and (iii) placing a plurality of cylindrical containers on their side in the first opening.

* * * * *